United States Patent
Gibson

(10) Patent No.: US 10,544,280 B1
(45) Date of Patent: Jan. 28, 2020

(54) JOINING COMPOSITIONS AND METHODS

(71) Applicant: SWIMC LLC, Cleveland, OH (US)

(72) Inventor: Melody N Gibson, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 63 days.

(21) Appl. No.: 15/959,760

(22) Filed: Apr. 23, 2018

Related U.S. Application Data

(60) Provisional application No. 62/488,428, filed on Apr. 21, 2017.

(51) Int. Cl.
| | | |
|---|---|---|
| *C08L 71/00* | (2006.01) | |
| *C09J 171/00* | (2006.01) | |
| *C08K 5/12* | (2006.01) | |
| *C08L 71/02* | (2006.01) | |
| *C08K 3/26* | (2006.01) | |
| *C08J 3/20* | (2006.01) | |
| *C09J 171/02* | (2006.01) | |
| *C09K 3/10* | (2006.01) | |
| *C08K 5/103* | (2006.01) | |
| *C08K 5/00* | (2006.01) | |

(52) U.S. Cl.
CPC .................. *C08K 5/12* (2013.01); *C08J 3/203* (2013.01); *C08K 3/26* (2013.01); *C08L 71/02* (2013.01); *C09J 171/02* (2013.01); *C09K 3/1018* (2013.01); *C08K 5/0016* (2013.01); *C08K 5/103* (2013.01); *C08K 2003/265* (2013.01); *C08L 2203/162* (2013.01); *C08L 2205/025* (2013.01)

(58) Field of Classification Search
CPC ......... C08L 71/00; C08K 5/0016; C08K 5/10; C08K 5/103; C09J 171/00; C09J 2471/00
See application file for complete search history.

(56) References Cited

U.S. PATENT DOCUMENTS

| | | | | |
|---|---|---|---|---|
| 6,586,512 B1* | 7/2003 | Dukes | ...................... | A61L 15/26 524/377 |
| 8,901,255 B2* | 12/2014 | Miyafuji | ................. | C08L 43/04 525/529 |
| 2002/0198308 A1* | 12/2002 | Lucas | .................. | C08G 65/336 524/501 |
| 2004/0074598 A1* | 4/2004 | Ando | .................... | C08G 65/336 156/325 |
| 2009/0170995 A1* | 7/2009 | Indesteege | ........... | C08G 65/336 524/425 |
| 2010/0004367 A1* | 1/2010 | Yano | .................... | C08G 65/2609 524/377 |
| 2013/0108882 A1* | 5/2013 | Stuart | .................. | C08G 18/718 428/489 |
| 2013/0281591 A1* | 10/2013 | Yano | ......................... | C08F 8/42 524/296 |
| 2015/0133622 A1* | 5/2015 | Harumashi | .......... | C08G 65/331 528/32 |
| 2015/0284609 A1* | 10/2015 | Schlosser | ............. | C08G 77/045 524/560 |
| 2016/0194443 A1* | 7/2016 | Shen | ...................... | C08G 65/336 524/588 |
| 2016/0326344 A1* | 11/2016 | Yano | ....................... | C08K 5/103 |
| 2017/0218223 A1* | 8/2017 | Bodkhe | ................ | C09D 171/02 |

* cited by examiner

*Primary Examiner* — Rip A Lee

(57) ABSTRACT

Disclosed are joining compositions that are suitable for use as adhesives or sealants in various embodiments. Generally, the compositions include silyl-modified polyether polymers in combination with dibenzoate plasticizers. When used as sealant compositions, the joining compositions can exhibit improved stability and reduced leaching of plasticizer components. When used as adhesives, the joining compositions can be used in numerous applications including residential and commercial building applications. Methods of manufacture and use of the compositions are also disclosed.

26 Claims, No Drawings

JOINING COMPOSITIONS AND METHODS

This application claims the benefit of U.S. provisional application No. 62/488,428 filed on Apr. 21, 2017, the entirety of which is hereby incorporated by reference.

TECHNICAL FIELD

The present disclosure is generally in the field of sealant and adhesive compositions and methods of making and using the same. In some embodiments, the disclosure is directed to a sealing or caulking composition with reduced tackiness, leaching, and dirt pick-up. In other non-mutually-exclusive embodiments, the disclosure is directed to a composition that may be used as an adhesive.

BACKGROUND

Joining compositions are compositions that may be used as sealants or adhesives and that join one surface to another, such as by filling a gap between two surfaces or by adhesively connecting one surface to another. In the case where the joining composition is intended as a sealant, the purpose of the composition is for sealing seams and joints in various structures. Sealant compositions often are used in the building industry to eliminate gaps between building elements to prevent ingress of water, dust, insects, and other unwanted factors. Such sealant compositions may also aid in thermal insulation, water resistance, and noise reduction. Elastomeric sealant compositions are desirable where the materials forming the joint are anticipated to move due to thermal expansion or contraction.

When the joining composition is intended for use as an adhesive, the purpose of the composition is to join one surface to a second surface. Again, a large variety of adhesives are known in the art, and such adhesives are used in many commercial applications including the residential and commercial construction industries. Roof sealants and sealants for use with glass, concrete, and aluminum all are known, for example.

Many commercial sealant and adhesive compositions are made with silicone, polyurethane, polysulfide, silyl-terminated polyether, or acrylic compounds. The choice of sealant compounds generally depends on the intended properties and applications. For instance, silicone sealant compositions are used in a wide variety of building applications due to generally good UV resistance, temperature resistance, movement capability, flexibility, and service life. Most silicon sealant compositions, however, do not accept paint well. Polyurethane sealant compositions, on the other hand, are generally desirable due to toughness and abrasion resistance. Polyurethane sealant compositions can generally be painted, but are often stiffer than silicone sealants. More recently, "MS Hybrid" (silyl-modified hybrid) sealant compositions have been developed in an effort to combine some of the strengths of both silicone and polyurethane sealants.

Sealant compositions generally are formulated with plasticizers, which are compounds that enhance the plasticity of the sealant composition. It is known that some plasticizers commonly used in MS Hybrid systems to increase flexibility or workability are known to migrate out of the system over time. Because plasticizers are joining substances, the migration can result in high dirt pick-up. In particular, many plasticizers used in MS hybrid sealants are phthalate-based. Such plasticizers are generally compatible with the silyl-modified base compound, but it is known that these plasticizers slowly leach from the sealant and can invade neighboring materials. This not only can reduce the flexibility of the sealant compositions and lead to dirt pick-up, but also can potentially undesirably alter adjacent materials and present potential environmental and toxicity concerns. Non-phthalate plasticizers exist, but there remain compatibility concerns. If the plasticizer is not compatible with the other components of the sealant composition, it will eventually migrate to the surface and either be flushed away, migrate into other materials, or adhere to dirt and other debris. In addition, some plasticizers used in MS Hybrid systems act as a food source for mildew and fungus, which can potentially lead to undesirable microbial growth.

Compositions that are useful as sealants are sometimes chemically similar to certain adhesive compositions, although in general sealants and adhesives generally have somewhat different properties. Sealants are used to close gaps between surfaces, and for this reason sealant compositions generally should have high elongation and flexibility and should exhibit low shrinkage after application. Sealants are often used as finishing compositions, and therefore resistance to mildew and dirt pick-up is highly desirable. Adhesives, on the other hand, are compositions that are used to join two surfaces together. Adhesives often have higher strength than sealants, and the resistance to mildew and dirt pick-up is of less importance because the adhesive composition is generally not visible upon curing. Nonetheless, in many cases properties desirable for an adhesive are similar to those desired of a sealant. For example, it is often desirable that an adhesive composition have some plasticity to prevent failure of the adhesive joint upon flexing or thermal expansion and contraction. It is further desirable that the composition be stable over time, such that any plasticizers in the composition are not prone to leaching out.

It is desired to provide a joining composition that is stable and that has sufficient plasticity for use as a sealant composition, in some embodiments, or as an adhesive composition, in other embodiments.

SUMMARY

It has now been found that joining compositions can be formulated with silyl-modified polyether polymers and dibenzoate plasticizers. Such plasticizers are believed to be more resistant to leaching out of the sealant than are phthalate plasticizers. The invention provides, in various non-exclusive embodiments, a joining composition such as an adhesive or sealant composition, in each case comprising a silyl-modified polyether sealant polymer that includes a dibenzoate plasticizer. The disclosed sealant compounds exhibit improved stability and reduced dirt pick-up and sealant migration.

In some embodiments, the joining composition comprises a silyl-modified polyether sealant and about 1-10 wt. % dibenzoate plasticizer, wherein the plasticizer comprises a blend of diethylene glycol dibenzoate, dipropylene glycol dibenzoate, and propylene glycol dibenzoate. In other embodiments, not mutually exclusive with respect to the above, the joining composition comprises a first silyl-modified polyether polymer, the first silyl-modified polyether polymer having a modulus of 60 or less, and a second silyl-modified polyether polymer, the second silyl-modified polyether polymer having a modulus of greater than 60 PSI, and about 1-10 wt. % dibenzoate plasticizer.

Also provided in other embodiments is a method of manufacture of a joining composition. This method generally comprises mixing a silyl-modified polyether sealant with a dibenzoate plasticizer. In some forms, the method comprises mixing a silyl-modified polyether sealant with a pre-blended dibenzoate blend as described above.

Further disclosed is a method for sealing. This disclosed method generally comprises applying a sealant composition that comprises silyl-modified polyether and a dibenzoate plasticizer to a joint between adjacent structural elements or to a crack or opening in a structural element.

Also disclosed is a method for adhering two surfaces to one another. The method generally comprises applying an adhesive composition that comprises a silyl-modified polyether sealant and a dibenzoate plasticizer.

DETAILED DESCRIPTION

Generally, the joining compositions described herein comprise one or more silyl-modified polyether polymers and one or more a dibenzoate plasticizers, in some cases a blend of plasticizers. The base polymer or polymers may collectively comprise from about 10% to about 90% by weight of the joining composition, preferably about 15% to about 40% by weight. The plasticizer may comprise about 1 wt. % to about 10 wt. %, preferably about 3 wt. % to about 4 wt. %, of the joining composition. The compositions can include any components known or otherwise determined to be suitable for use in sealing and adhesive compositions. The designation of a particular composition as a sealant or as an adhesive is to some extent a question of degree, inasmuch as any particular composition may be useful to some extent for both purposes. Generally, however, a sealant composition will be formulated to have a high degree of flexibility and accommodation of thermal expansion and contraction, whereas adhesives are formulated with a focus on their ability to adhere two surfaces to one another.

The compositions generally include one or more non-sag polyether silicon terminated polymers, in particular silyl-modified polyether polymers. A variety of silyl-modified polyether polymers may be employed in conjunction with the joining compositions, including low modulus polymers (<60 PSI) and high modulus polymers 60 PSI). Suitable polymers are sold by Kaneka North America LLC. of Pasadena Texas under the "MS" product designation. These include, for example, MS SAT010 (modulus 140 PSI); MS SAX350 (modulus 110 PSI); MS 5203H (modulus 40 PSI); MS 5303H (modulus 90 PSI); MS SAX400 (modulus 130 PSI); MS S227 (modulus 20 PSI); and MS MAX951 (modulus 60 PSI). Other suitable silyl-modified polyether polymers may be employed, and mixtures of silyl-modified polyether polymers may be employed. The choice of a particular polymer or mixture of polymers is within the purview of one skilled in the art, and will be guided by the properties desired of the resulting composition.

The polymer or blend of polymers is combined with a dibenzoate plasticizer to yield a joining composition. One preferred type of preferred plasticizer for use in the invention comprises a blend of diethylene glycol dibenzoate, dipropylene glycol dibenzoate, and propylene glycol dibenzoate. In some embodiments, the plasticizer comprises diethylene glycol dibenzoate, dipropylene glycol dibenzoate, and 1,2-propylene glycol dibenzoate. In some embodiments, the dibenzoate blend may comprise about 10-90 wt. %, preferably about 60-90 wt. % diethylene glycol dibenzoate; about 1-50 wt. %, preferably about 15-50% dipropylene glycol dibenzoate; and 10-90%, preferably about 20-90% propylene glycol dibenzoate. In one form, a dibenzoate triblend for use in the present invention comprises about 64 wt. % diethylene glycol dibenzoate, about 16 wt. % dipropylene glycol dibenzoate, and about 20% 1,2-propylene glycol dibenzoate. One suitable plasticizer is K-Flex 975P, available from Emerald Kamala Chemical LLC of Vancouver, Wash.

The joining composition may optionally include functional additives, such as biocides, blueing agents or brighteners, colorants, surfactants, defoamers, thickening agents, and fillers. Such additives may be used in any amount effective for the intended purpose of the additive. Suitable biocides include, without limitation, tributyltin salicylate, isothiazolinones and metal compounds having biocidal activity. Suitable blueing agents include, without limitation, fluorescent brighteners well known in the art. Suitable colorants include, for example, titanium dioxide and carbon black. Suitable surface-active agents include, without limitation, sodium salts of organic carboxylic acids including sodium lauryl sulfate, potassium tripolyphosphate. Suitable defoamers include petroleum-based defoamers. Suitable thickening agents include, without limitation, cellulosic thickening agents, polymeric thickening agents and organic and inorganic clays that are effective as thickeners. Suitable fillers include, without limitation, talc, clay, silica and calcium carbonate. Calcium carbonate is a particularly preferred filler. Other additives may also be included. For example, the sealant may be formulated with light-resisting agents such as benzotriazole, crosslinking agents such as vinyltrimethoxysilane, and hardening catalysts.

These components may be fashioned into a joining composition by any conventional manner known by those of skilled in the art. The method of manufacture can include mixing the silyl-modified polyether with the other components and with the dibenzoate plasticizer or with a pre-blended mixture of dibenzoate plasticizers. The resulting composition preferably meets the requirements of Class 25 under ASTM C920, meaning that they will withstand 25% extension and 25% compression. In some embodiments the composition can withstand 35% extension and 35% compression as evaluated under ASTM C920.

In some embodiments, a method of manufacturing a sealant composition is provided, the method comprising mixing a silyl-modified polyether with about 1-10 wt. % dibenzoate plasticizer and with any other optional additives. In some embodiments, the method comprises mixing about 3-4 wt. % dibenzoate plasticizer with the other components of the composition. The plasticizer mixed with the silyl-modified polyether may in some forms comprise a blend of diethylene glycol dibenzoate, dipropylene glycol dibenzoate, and propylene glycol dibenzoate. The plasticizer in some embodiments comprises about 10-90 wt. % diethylene glycol dibenzoate, about 1-50 wt. % dipropylene glycol dibenzoate, and about 10-90% propylene glycol dibenzoate, and preferably about 60-90 wt. % diethylene glycol dibenzoate, about 15-50% dipropylene glycol dibenzoate, and about 20-90% propylene glycol dibenzoate.

After manufacture, the joining composition may be applied by any known method, including conventional extrusion through a nozzle or spreading with a trowel. A conventional caulking tool may be used to apply the composition. In taking the form of a sealant composition, the joining composition may be used in connection with the device and method described in U.S. Pat. No. 8,572,903, entitled "Device, kit and method for sealing roof penetrations," which is incorporated by reference in its entirety. When used as an adhesive, the adhesive may be, for example, an adhesive for aluminum, concrete, or glass. When used as a sealant, the composition may be a roof sealant or exterior caulking agent. Generally, the joining composition is contemplated to be useful in numerous adhesive or sealant applications.

The following examples are provided to illustrate the present invention but should not be construed as limiting the invention.

Example 1

A white sealant composition containing K-Flex 975P (diethylene glycol dibenzoate, dipropylene glycol dibenzoate, and propylene glycol dibenzoate tri-blend, Emerald Performance Materials) was prepared by mixing the following ingredients in the indicated amounts:

| Component | Amount |
|---|---|
| Low modulus silyl-modified polymer sealant (MS S227) | 16% |
| High modulus silyl-modified polymer sealant (MS S303H) | 9.6% |
| Dibenzoate tri-blend | 3.77% |
| Low molecular weight hindered amine light stabilizer | 0.16% |
| Benzotriazole UV light absorber | 0.18% |
| Nanoparticle precipitated calcium carbonate | 1.33% |
| Calcium carbonate (median particle size 13 microns) | 26.41% |
| Titanium dioxide | 1.48% |
| Ultrafine calcium carbonate | 36.47% |
| Vinyltrimethoxysilane crosslinking agent | 3.0% |
| N(beta-aminoethyl)gamma-aminopropyltrimethoxy-silane | 1.10% |
| Hardening catalyst | 0.51% |

The first eight listed ingredients were combined and mixed in a high speed planetary mixer at 200° F. for 90 minutes. 36.47 wt. % ultrafine calcium carbonate was then added and mixed for an additional 90 minutes. The mixture was then cooled, and the cross-linking agent was added. The composition was then mixed while heating to 100° F. and the remaining silane and hardening catalyst were added while mixing for an additional 15 minutes.

The resulting sealant was compared to M-1® Universal Adhesive/Sealant (ChemLink Polymer Innovation) and exhibited similar general appearance, resistance to cracking and flaking, and efflorescence. Both compounds were rated by a panel for mildew resistance on a scale of 1 to 10, with 1 being the worst and 10 being the best. The inventive example was given a mean score of 8.455, while the M-1® sealant achieved a mean score of 5.32, showing a significant increase in rated mildew resistance over the commercial M-1® product.

Example 2

A black sealant composition containing K-Flex 975P (diethylene glycol dibenzoate, dipropylene glycol dibenzoate, and propylene glycol dibenzoate tri-blend, Emerald Performance Materials) was prepared by mixing the following ingredients in the indicated amounts:

| Component | Amount |
|---|---|
| Low modulus silyl-modified polymer sealant (MS S227) | 15.44% |
| High modulus silyl-modified polymer sealant (MS S303H) | 9.26% |
| Dibenzoate tri-blend | 3.18% |
| Low molecular weight hindered amine light stabilizer | 0.16% |
| Benzotriazole UV light absorber | 0.17% |
| Nanoparticle precipitated calcium carbonate | 1.28% |
| Calcium carbonate (median particle size 13 microns) | 27.73% |
| Carbon black paste | 3.95% |
| Ultrafine calcium carbonate | 36.97% |
| Vinyltrimethoxysilane crosslinking agent | 3.13% |
| N(beta-aminoethyl) gamma-aminopropyltrimethoxy-silane | 1.06% |
| Hardening catalyst | 0.49% |

The first eight ingredients were combined and mixed in a high speed planetary mixer at 200° F. for 90 minutes. 27.73 wt. % ultrafine calcium carbonate was then added and mixed for an additional 90 minutes. The mixture was then cooled, and the cross-linking agent was added. The composition was then mixed while heating to 100° F. and the remaining silane and hardening catalyst were added while mixing for an additional 15 minutes.

The resulting sealant was compared to M-1® Universal Adhesive/Sealant (ChemLink Polymer Innovation) and exhibited similar general appearance, resistance to cracking and flaking, and efflorescence.

It is thus that various joining compositions are provided. Without wishing to be bound by theory, it is believed that the polarity and number of functional groups of dibenzoate plasticizers result in a stable system when combined with silyl-modified sealant compositions, resulting in reduced plasticizer migration and subsequent reduced leaching and mildew resistance.

All methods described herein can be performed in any suitable order unless otherwise indicated herein or otherwise clearly contradicted by context. The use of any and all examples, or language describing an example (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A joining composition comprising:
   a silyl-modified polyether polymer; and
   about 1-10 wt % dibenzoate plasticizer, wherein the dibenzoate plasticizer comprises a blend of diethylene glycol dibenzoate, dipropylene glycol dibenzoate, and propylene glycol dibenzoate.

2. The joining composition according to claim 1, comprising about 90-97 wt % silyl-modified polyether polymer and about 3-4 wt % dibenzoate plasticizer.

3. The joining composition according to claim 1, wherein the dibenzoate plasticizer comprises about 10-90 wt % diethylene glycol dibenzoate, about 1-50 wt % dipropylene glycol dibenzoate, and about 10-90 wt % propylene glycol dibenzoate.

4. The joining composition according to claim 3, wherein the dibenzoate plasticizer comprises about 60-90 wt % diethylene glycol dibenzoate, about 15-50 wt % dipropylene glycol dibenzoate, and about 20-90 wt % propylene glycol dibenzoate.

5. The joining composition according to claim 1, wherein the joining composition comprises a silyl-modified polyether polymer having a modulus of 60 psi or less.

6. The joining composition according to claim 1, wherein the joining composition comprises a silyl-modified polyether polymer having a modulus of 60 psi or greater.

7. The joining composition according to claim 1, wherein the joining composition comprises a first silyl-modified polyether polymer, the first silyl-modified polyether polymer having a modulus of 60 psi or less, and a second silyl-modified polyether polymer, the second silyl-modified polyether polymer having a modulus of greater than 60 psi.

8. The joining composition according to claim 1, wherein the joining composition comprises a calcium carbonate filler.

9. A joining composition comprising:
a first silyl-modified polyether polymer, the first silyl-modified polyether polymer having a modulus of 60 psi or less, and a second silyl-modified polyether polymer, the second silyl-modified polyether polymer having a modulus of greater than 60 psi; and
about 1-10 wt % dibenzoate plasticizer.

10. A method of manufacturing a joining composition, the method comprising:
mixing a silyl-modified polyether polymer with about 1-10 wt % dibenzoate plasticizer, wherein said plasticizer comprises a blend of diethylene glycol dibenzoate, dipropylene glycol dibenzoate, and propylene glycol dibenzoate.

11. The method according to claim 10, the method comprising mixing about 90-97 wt % silyl-modified polyether polymer with about 3-4 wt % dibenzoate plasticizer.

12. The method according to claim 11, wherein the dibenzoate plasticizer comprises about 10-90 wt % diethylene glycol dibenzoate, about 1-50 wt % dipropylene glycol dibenzoate, and about 10-90 wt % propylene glycol dibenzoate.

13. The method according to claim 12, wherein the plasticizer comprises about 60-90 wt % diethylene glycol dibenzoate, about 15-50 wt % dipropylene glycol dibenzoate, and about 20-90 wt % propylene glycol dibenzoate.

14. The method according to claim 10, wherein the silyl-modified polyether polymer has a modulus of 60 psi or less.

15. The method according to claim 10, wherein the silyl-modified polyether polymer has a modulus of 60 psi or greater.

16. The method according to claim 10, the silyl-modified polyether polymer including a first silyl-modified polyether polymer, the first silyl-modified polyether polymer having a modulus of 60 psi or less, and a second silyl-modified polyether polymer, the second silyl-modified polyether polymer having a modulus of greater than 60 psi.

17. The method according to claim 10, comprising incorporating a calcium carbonate filler.

18. The method according to claim 10, comprising incorporating a crosslinking agent.

19. The method according to claim 10, including incorporating a hardening catalyst.

20. A method comprising applying a joining composition to a joint or crack as a sealant composition, the sealant composition comprising:
a silyl-modified polyether polymer; and
about 1-10 wt % dibenzoate plasticizer, wherein the dibenzoate plasticizer comprises a blend of diethylene glycol dibenzoate, dipropylene glycol dibenzoate, and propylene glycol dibenzoate.

21. A method comprising applying a joining composition to a joint or crack as a sealant composition, the sealant composition comprising
a first silyl-modified polyether polymer, the first silyl-modified polyether polymer having a modulus of 60 psi or less, and a second silyl-modified polyether polymer, the second silyl-modified polyether polymer having a modulus of greater than 60 psi, and about 1-10 wt % dibenzoate plasticizer.

22. A method comprising applying a joining composition as an adhesive composition to adhere two surfaces to one another, the adhesive composition comprising:
a silyl-modified polyether polymer; and
about 1-10 wt % dibenzoate plasticizer, wherein said plasticizer comprises a blend of diethylene glycol dibenzoate, dipropylene glycol dibenzoate, and propylene glycol dibenzoate.

23. A method comprising applying a joining composition as an adhesive composition to adhere two surfaces to one another, the adhesive composition comprising:
a first silyl-modified polyether polymer, the first silyl-modified polyether polymer having a modulus of 60 psi or less, and a second silyl-modified polyether polymer, the second silyl-modified polyether polymer having a modulus of greater than 60 psi, and about 1-10 wt % dibenzoate plasticizer.

24. A method according to claim 23, wherein at least one of the two surfaces is an aluminum surface.

25. A method according to claim 23, wherein at least one of the two surfaces is a concrete surface.

26. A method according to claim 23, wherein at least one of the two surfaces is a glass surface.

\* \* \* \* \*